United States Patent [19]

Muller et al.

[11] 4,399,343
[45] Aug. 16, 1983

[54] METHOD AND APPARATUS FOR RESISTANCE WELDING OF CANS

[75] Inventors: Jakob Muller, St. Blaise; Peter Schreiber, Nidau, both of Switzerland

[73] Assignee: Fael SA, Saint-Blaise, Switzerland

[21] Appl. No.: 253,488

[22] Filed: Apr. 13, 1981

[51] Int. Cl.³ .................... B23K 11/32; B23K 11/06
[52] U.S. Cl. ....................................... 219/64; 219/66; 219/83
[58] Field of Search ............... 219/64, 66, 83; 413/69; 198/579, 462; 228/47, 49 R

[56] References Cited

U.S. PATENT DOCUMENTS

| | | | |
|---|---|---|---|
| 602,647 | 4/1898 | Steegmuller | 413/69 X |
| 3,544,753 | 12/1970 | Aschberger | 219/64 |
| 3,591,756 | 7/1971 | Timko | 219/64 |

Primary Examiner—Elliot A. Goldberg
Attorney, Agent, or Firm—Charles E. Brown

[57] ABSTRACT

A welder for welding side seams of tubular bodies. The welder has a body feed in the form of a single conveyor which serves to receive bodies at regular intervals from a rounded unseamed tubular body supply and to move the bodies into a welding head nip with the bodies being initially widely spaced and then the gap between a body in the welding head and a trailing body being rapidly reduced so that the leading edge of a following body enters into the nip at the same moment as the trailing edge of a leading body begins to depart from the nip, with the adjacent edges of adjacent bodies being in substantially touching but positively spaced relation.

11 Claims, 10 Drawing Figures

METHOD AND APPARATUS FOR RESISTANCE WELDING OF CANS

This invention relates in general to new and useful improvements in apparatus for welding of the side seams of tubular bodies, and more particularly to a conveyor for feeding rounded unseamed tubular bodies to a welding head of the type including a pair of roller electrodes having a nip therebetween.

It is conventional to form from flat blanks rolled unseamed tubular bodies and supply them to a continuously moving conveyor at a uniform rate in a manner wherein the tubular bodies are disposed in relatively widely spaced relation along the conveyor and wherein such widely spaced tubular bodies are then transferred to a slower moving conveyor with the spacing between the tubular bodies on the second conveyor being relatively narrow. The second conveyor then feeds the tubular bodies into the nip of the welding head.

In prior art welding apparatus of the type mentioned above, it has been necessary to time the movement of the leading and trailing edge of a tubular body being welded with respect to the pulsed flow of electrical energy into the welding head, and thus complex feed means relating to the driving of the second conveyor and the roller electrodes has been required.

It has been found that if the gap between adjacent tubular bodies is very small so that the welding electrodes bridge two adjacent tubular bodies, no detrimental over-heating effect is obtained, and thus there is no longer a need to corelate the positions of the leading and trailing edges of the tubular bodies with the pulsed flow of electrical energy.

In accordance with this invention, it is proposed to provide a simplified feed mechanism for conveying the rounded unseamed tubular bodies from a supply source into the nip of the welding head utilizing a single conveyor and wherein, although the tubular bodies are initially widely spaced, at the time the leading end of a tubular body enters into the welding nip, there is very closely adjacent a trailing end of a welded preceding tubular body then exiting from the nip.

It has been particularly found that the known movement of a conveyor chain or belt around an arcuate path will provide for the slowing down of a tubular body being pushed along a predetermined straight path and that when the initial spacing of the tubular bodies is properly interrelated with the initial speed of the tubular bodies, the nip speed and the radius of curvature of the rounded path of movement of the conveyor, succeeding tubular bodies may be accurately positioned into the welding nip in spaced but substantially touching relation with respect to welded preceding tubular bodies.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
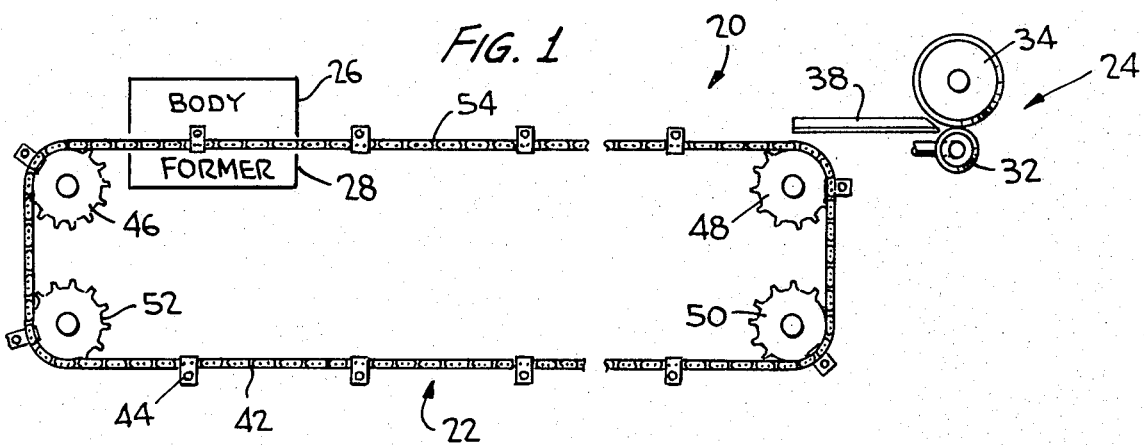
FIG. 1 is a side elevational view of apparatus in accordance with this invention.

Referring now to the drawings in detail, it will be seen that there is illustrated a welding apparatus in accordance with this invention which is generally identified by the numeral 20 and which most particularly is provided with a body conveyor 22 which is the principal feature of the invention. The welding apparatus also includes a welding head 24 to which a tubular body to have its side seam welded is delivered. The apparatus further includes a tubular body former generally identified by the numeral 26.

It is to be understood that in accordance with this invention a tubular body B, such as a container body, is formed by a forming device from a flat blank into a rounded tubular body having overlapping edge portions which have not been secured together. The overlapped edge portions are to be welded together so as to complete the tubular body. Thus, the body former 26 supplies to the apparatus 20 a rolled unseamed tubular body B. The bodies are directed into the body conveyor 22 at a fixed location 28 and at regularly spaced time intervals. The unseamed tubular bodies are then delivered by the conveyor 22 to the welding head 24.

The welding head 24 is of a conventional construction and includes a suitable welding horn 30 for supporting the tubular bodies B during the welding of the side seams and after the side seams are welded. The welding head 24 also includes an internal roller electrode 32 which is mounted within the horn 30 and an exterior roller electrode 34. The welding head 24 is preferably of the wire electrode type wherein each of the roller electrodes 32, 34 will function primarily as a pulley and a conductor for continuously moving wires in a known manner, although the invention is not restricted to the roller electrodes 32, 34 directly contacting the side seam portions of a tubular body and introducing the required electrical energy for welding directly into the tubular body.

The conveyor 22 includes suitable supporting guides 36 which extend generally between the body former 26 and the horn 30 for supporting the unseamed bodies. There will also be suitable external guide means (not shown and not a part of this invention) which will maintain the shape of the tubular body at the time it is advanced into the horn 30. The horn 30 will normally have incorporated at the 12:00 o'clock position thereof a guide member in the form of a conventional Z-bar 38 so as to maintain the overlapped edges of an unseamed body in a preselected relationship for welding.

As previously described, bodies to be welded were individually fed to the welding head 24 in spaced relation so as to require a timing of the position of the leading end or edge of the body for engagement with the electrodes and a similar timing of the departure of the trailing end or edge of a body from the electrodes. This required a variation in both the speed of the electrodes at the nip between the electrodes, which nip is identified by the numeral 40, and the speed of the conveyor delivering the body to the electrodes. It has been found that if the tubular bodies are in substantially touching relation but slightly spaced apart within the nip 40, no special timing of the leading and trailing edges of a body with respect to the electrical current flow pulse is required. This invention particularly relates to the provision of a single conveyor feed for receiving rounded unseamed bodies B in widely spaced relation, moving the bodies at a speed much greater than the speed of the nip 40, and then just before a body is directed into the nip 40, slowing the movement of the body down to nip speed while at the same time closing the gap between adjacent bodies to substantially zero, but retaining a positive gap between adjacent bodies.

Figure 3:
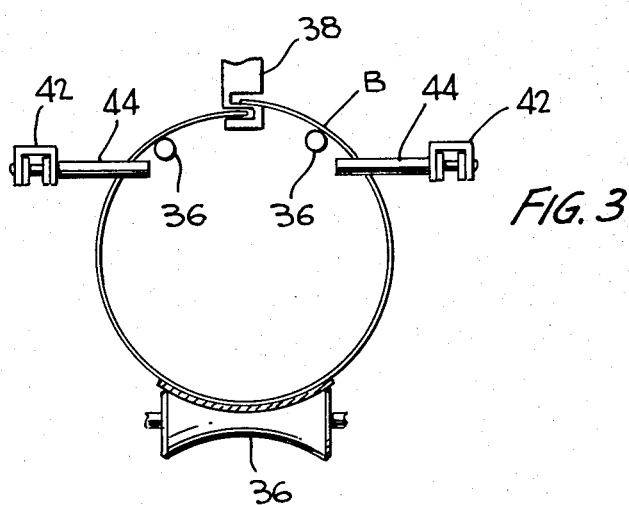
FIG. 3 is a transverse sectional view taken generally along the line 3—3 of FIG. 1.
Figure 4:
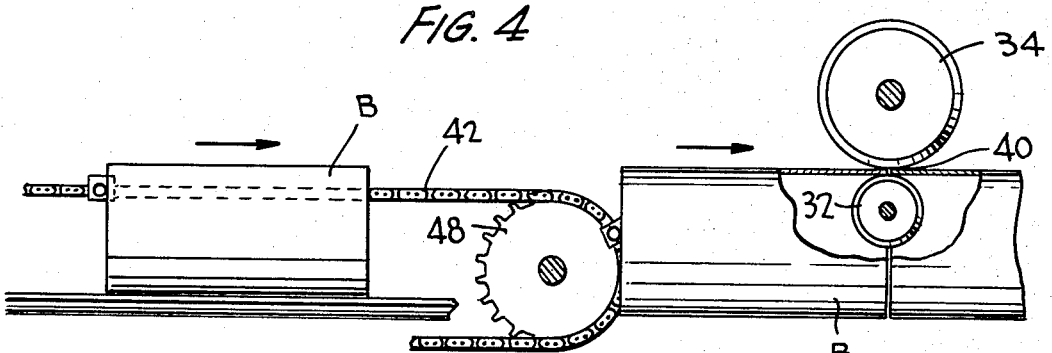
FIG. 4 is an enlarged diagrammatic side elevational view in the area of body transfer to the welding head.

The conveyor 22 fulfills this requirement and includes two separate conveyor chains or belts 42 located on opposite sides of the path along which bodies are moved from the body former 26 into the nip 40. Each chain or belt 42 is provided at spaced intervals with transversely extending pushers 44. As is best shown in FIG. 3, the pushers 44 generally oppose one another and engage a body trailing end at preselected points below the topmost portion thereof. The pusher elements 44 are preferably rounded in cross section so that they may slide vertically along the trailing edge of a body.

In the illustrated embodiment of the invention, each conveyor chain or belt 42 is supported by four pulleys or sprockets 46, 48, 50 and 52. The position of the pulleys or sprockets 46 and 48 is critical, and the diameter of the pulley or sprocket 48 is critical. As will be readily apparent from FIG. 1, the sprockets or pulleys 46, 48 define an upper run 54 of the conveyor chain or belt. This upper run preferably is parallel to the path of movement of tubular bodies.

As will be described in more detail hereinafter, it is desired that the nip speed and the rotational speed of the pulley or sprocket 48 be maintained at a constant relationship. Generally speaking, the speed of the conveyor along the run 54 will be on the order of twice nip speed. The speed of the pushers 44 along the top run 54 will remain constant so that the bodies are moved at a constant speed until they reach a position closely adjacent to the welding head 24.

It is to be understood that a body is transferred into the nip 40 at a speed preferably identical to the speed of the nip, but preferably not greater than the speed of the nip in that this may result in the jamming of the leading portion of the body into the nip and the deformation of the metal of the body.

Figure 5:
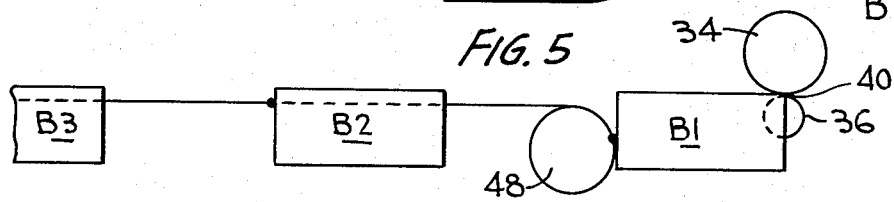
FIG. 5 is a schematic side elevational view with a new body being delivered to the welding head nip.

Reference is now made to FIGS. 5-9 wherein, in FIG. 5, a first body B1 is traveling at nip speed and has just entered the nip 40. A second body B2 is being moved by the conveyor 22 at the linear speed of the conveyor, which speed, as described above, is approximately twice nip speed. At this time the spacing between adjacent bodies B1 and B2 is equal to the initial spacing between those bodies less the amount of slowdown of the body B1. A body B3 following the body B2 is spaced therefrom a distance equal to the spacing of the pushers 44.

Figure 6:
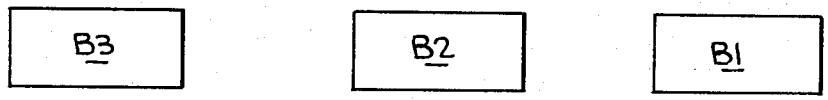
FIG. 6 is a schematic view similar to FIG. 5, and shows the new body advanced approximately one-quarter of the way through the nip.

Referring now to FIG. 6 wherein the body B1 has advanced one-quarter of its length through the nip 40, it will be seen that the body B2, since it is moving twice as fast as the body B1, has shortened the gap between it and the body B1 by one-quarter the length of the body. In the meantime, the spacing between the bodies B2 and B3 has remained unchanged.

Figure 7:
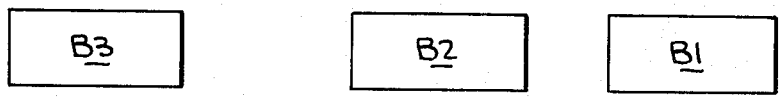
FIG. 7 is a schematic view similar to FIG. 5, and shows the new body advanced approximately one-half of the way through the nip.

With reference to FIG. 7, when the body B1 has moved one-half of its length into the nip, since the body B2 is still moving at twice the speed of the body B1, the body B2 has now closed the gap between it and the body B1 to be one-half the length of the body.

Figure 8:
FIG. 8 is a schematic view similar to FIG. 5, and shows the new body advanced approximately three-quarters of the way through the nip.

Referring now to FIG. 8, it will be seen that the body B1 is now three-quarters of the way through the nip and the body B2 is still moving at twice nip speed. Thus, the body B2 has further advanced relative to the body B1 by a distance of one-fourth of the body length. At the same time, the spacing between the bodies B2 and B3 has remained constant. At this time, the spacing between the bodies B1 and B2 is equal to one-quarter of the body length less the spacing loss due to the movement of the associated pusher 44 around the sprocket or pulley 48.

Figure 9:
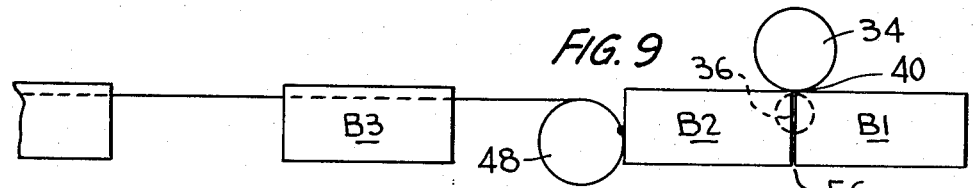
FIG. 9 is a schematic view similar to FIG. 5, and shows the new body advanced approximately all of the way through the nip and with a next following body proceeding into the nip.
Figure 10:
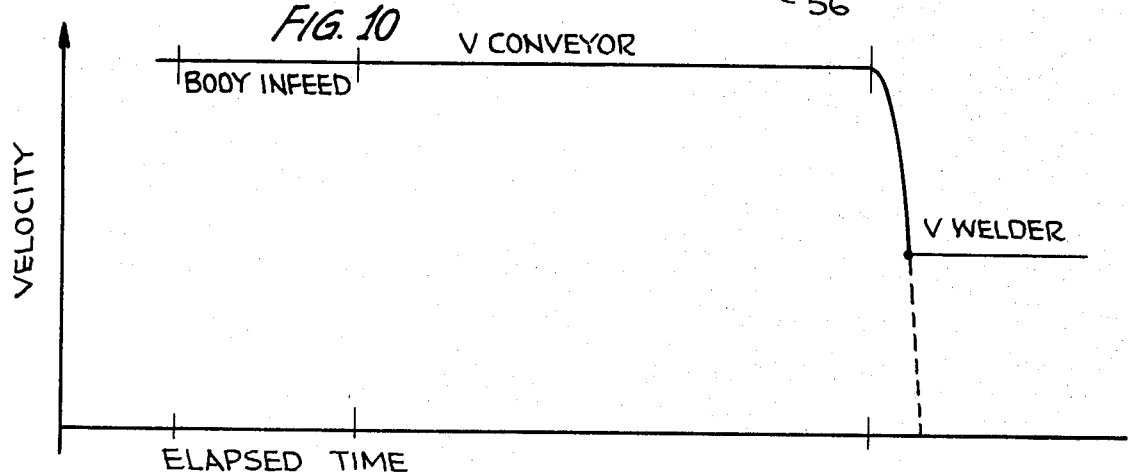
FIG. 10 is a diagram plotting body velocity versus elapsed time.

In FIG. 9 the body B1 has just begun to exit the nip 40 and the body B2 is about to enter the nip. At this time the leading edge of the body B2 is substantially touching but very slightly trails the trailing edge of the body B1. The spacing 56 between the bodies B1 and B2 is such that in actuality both bodies are still in the nip 40 and electrical energy is simultaneously flowing in both bodies.

Figure 2:
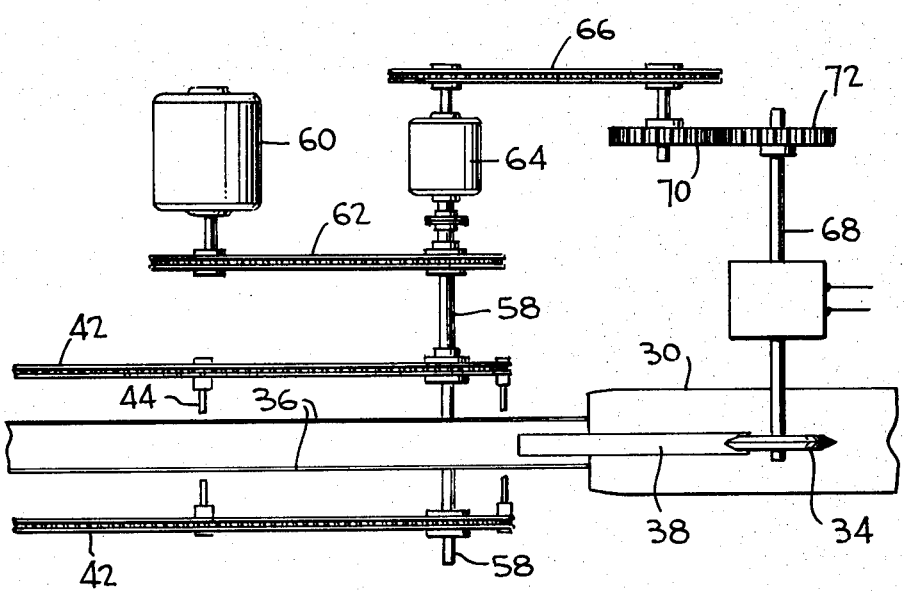
FIG. 2 is a top plan view of the apparatus, and additionally shows the drive of the apparatus.

Reference is now made to FIG. 2 wherein it will be seen that the two pulleys or sprockets 50 are carried by a shaft 58, which is driven by a motor 60 through a drive train 62. The shaft 58 also has an extension including a reduction gear unit 64 which is coupled by a drive train 66 for a shaft 68 which carries the roller electrode 34. It is to be understood that the drive train 66 should include a pair of meshing gears 70, 72 so as to reverse the direction of rotation of the shaft 68 from that of the shaft 58.

While the specific drive trains described above are a preferred embodiment of the invention, it is to be understood that the shafts 58 and 68 may be driven in any desired manner as long as the relative speeds of the shafts remain constant. As will be apparent from the foregoing description of the invention, the peripheral speed of the electrode 34 or the surface of a wire carried thereby in the case of a wire welder, must be one-half the peripheral speed of the sprockets or pulleys 48 in the illustrated and described example of the invention. However, the 2:1 relationship is not a compulsory one and may be varied as desired. It is understood with a 2:1 relationship between the speeds of the sprockets or pulleys 48 and the roller electrode 34, the spacing between adjacent pushers is almost equal to the length of a body and when the speed ratio is increased to 3:1, for example, the spacing between adjacent pushers is increased to be generally twice the length of a body. It is to be understood that since the pushers move constantly, the pushers must be spaced apart a distance sufficient to permit the introduction of a newly formed unseamed tubular body between adjacent pushers and, generally speaking, the spacing of the pushers is twice that of the length of a tubular body being handled.

It will be readily apparent that once the general geometry of the conveyor 22 has been established, the spacing 56 between adjacent bodies in the nip 40 may be varied by adjusting the position of the sprocket or pulley 48 relative to the nip. Only one adjustment is required.

Although advantageously the speed of a body may be reduced from that of the pushers 44 to that of the nip by passing the pushers about an arcuate path, the same result could be obtained by having the pushers move along a straight sloping path.

It will be apparent that in order for the speed of a pusher to be reduced by one-half, it must pass through an arcuate path of 60°. If there are other speed ratios than the afore-discussed 2:1 ratio, then the arc through which the pusher must pass will be varied accordingly.

It will be readily apparent from the drawings that as a pusher continues about the arc of the pulley or sprocket 48, its longitudinal movement will continue to decrease until it reaches zero after having moved through a 90° arc. Thus, after a body has had the speed thereof reduced to the nip speed and the leading end of the body is within the nip to be driven by the roller electrodes, the body will be, in effect, drawn forwardly away from its associated pusher. Thus, when the pulleys or sprockets 48 are accurately positioned relative to the nip 40, there will be no jamming of a body into the nip.

Although only a preferred embodiment of the invention has been specifically illustrated and described herein, it is to be understood that minor variations in the drive mechanism may be made without departing from the spirit and scope of the invention as defined by the appended claims.

We claim:

1. In a welder for side seams of tubular bodies of the type including cans, a pair of cooperating roller electrodes defining a welding nip for simultaneously advancing a tubular body at a preselected speed and effecting the welding of a side seam of the tubular body, apparatus for supplying rolled unseamed tubular bodies; a single conveyor defining means for (1) receiving unseamed tubular bodies at regularly spaced intervals along said conveyor, (2) moving the unseamed tubular bodies toward said nip at a speed materially greater than the speed of said nip, and (3) reducing the speed of movement of the tubular body to substantially the speed of said nip immediately before said nip.

2. Apparatus according to claim 1 wherein said conveyor moves at a constant rate.

3. Apparatus according to claim 2 wherein the relation of the higher speed of said conveyor with respect to the speed of said nip and the rate of tubular body advance decrease taken with the initial spacing of tubular bodies on said conveyor is such that as a trailing end of a leading tubular body is passing out of said nip a leading end of a next following tubular body is received in said nip in spaced but substantially touching relation.

4. Apparatus according to claim 1 wherein the relation of the higher speed of said conveyor with respect to the speed of said nip and the rate of tubular body advance decrease taken with the initial spacing of tubular bodies on said conveyor is such that as the trailing end of a leading tubular body is passing out of said nip a leading end of the next following tubular body is received in said nip in spaced but substantially touching relation.

5. Apparatus according to claim 1 wherein there is a support for tubular bodies defining the path of tubular bodies between said apparatus for supplying tubular bodies and said nip, and said conveyor includes pusher means for engaging trailing ends of tubular bodies and moving the tubular bodies along said path.

6. Apparatus according to claim 5 wherein said reduction of the speed of movement of a tubular body is effected by moving each pusher means at a constant rate and changing the direction of movement of each pusher means to have a direction component normal to said path such that the direction component parallel to said path provides a speed less than said constant rate and equal to said nip speed.

7. Apparatus according to claim 1 wherein drives for said roller electrodes and said conveyor are interrelated and a constant ratio is maintained between said conveyor speed and said nip speed.

8. Apparatus according to claim 7 wherein a single motor is the prime mover for said drives.

9. A method of transferring rolled unseamed tubular bodies to a welding nip between a pair of electrode rollers wherein at least one of said rollers is driven to provide a selected nip speed, said method comprising the use of a single conveyor means moving at a constant linear rate greater than said nip speed, feeding rolled unseamed tubular bodies to said single conveyor means at a preselected position on said conveyor means remote from said nip and at regular time intervals, engaging the tubular bodies at uniformly spaced linear intervals by pusher means on said conveyor means and advancing the tubular bodies at a constant linear speed and at a constant preselected spacing, changing the direction of movement of the conveyor pusher means as a leading end of a leading tubular body approaches said nip to progressively reduce the speed of the leading tubular body until the leading tubular body leading end is at said nip and is moving at said nip speed with the leading end of the leading tubular body carried by said conveyor means being in spaced substantially touching relation to a preceding tubular body then exiting from said nip.

10. A method according to claim 9 wherein the spacing between the tubular bodies moving along said nip is substantially equal to but less than the total linear slow down of a tubular body due to the change in direction of movement of said conveyor pusher means and wherein the spacing of a tubular body entering said nip from a tubular body exiting said nip is uniform.

11. A method according to claim 9 wherein the speed of movement of said conveyor pusher means toward said nip continues to decrease below the nip speed whereby the nip takes the leading tubular body away from the conveyor means.

* * * * *